United States Patent [19]

Baker et al.

[11] Patent Number: 4,536,052
[45] Date of Patent: Aug. 20, 1985

[54] MODULAR CROSS-CONNECT PANEL

[75] Inventors: Donn Baker, Middletown; John E. Clarke, Colts Neck, both of N.J.; Chris G. Johnson, New York, N.Y.

[73] Assignee: AT&T Information Systems, Holmdel, N.J.

[21] Appl. No.: 578,634

[22] Filed: Feb. 9, 1984

[51] Int. Cl.³ .............................................. H05K 7/16
[52] U.S. Cl. .................. 339/126 R; 179/98; 361/428
[58] Field of Search ................ 179/98; 361/340, 391, 361/426, 428, 429, 427; 339/18 R, 18 C, 126 R, 125 R

[56] References Cited

U.S. PATENT DOCUMENTS

| | | | |
|---|---|---|---|
| 3,649,953 | 3/1972 | Hoffman | 339/132 B |
| 4,012,100 | 3/1977 | Viscosi | 339/198 H |
| 4,160,880 | 7/1979 | Brey | 179/98 |
| 4,320,261 | 3/1982 | Scerbo et al. | 179/98 |
| 4,371,757 | 2/1983 | Debortoli et al. | 179/98 |

FOREIGN PATENT DOCUMENTS

| | | | |
|---|---|---|---|
| 2361794 | 4/1978 | France | 179/98 |
| 570577 | 12/1957 | Italy | 179/98 |

Primary Examiner—Neil Abrams
Attorney, Agent, or Firm—David H. Tannenbaum

[57] ABSTRACT

There is disclosed a cross-connect having a hinged rotating section panel which accepts multi-pair cables. The hinged section is mounted to a forward edge of a support section and the multi-pair cables are suspended between the two sections so that the cables remain in the same plane regardless of the position of the hinged section. The user cross connects between the cable pairs using the familiar modular plug and jack. The design of the cross-connect field is modular so that the cross-connect field can easily be added to as the system grows. The forward edge of the support panel slopes vertically to insure that the patch cords dress properly from top to bottom.

21 Claims, 8 Drawing Figures

MODULAR CROSS-CONNECT PANEL

BACKGROUND OF THE INVENTION

This invention relates to a cross connect panel and more particularly to a modular structure allowing for simple and efficient utilization.

In telecommunications it is necessary to cross connect particular telephone lines which extend from the individual telephones within a specific physical location to the trunk circuits which extend through a PBX to the central switching facility. In the past this has been accomplished by telephone company craftspersons in response to requests from customers. In the interest of economy and also because of the changing nature of the telephone industry it is now desirable to have customers make their own telephone rearrangements without using skilled personnel.

The problems which arise are two-fold. First, the typical cross connect field used for the past twenty (20) years is the type where wires are pushed between two closely spaced blades. The blades both cut the insulation on the wire and make electrical contact to complete the connection between the telephone and the PBX or other central switching facility. This operation is one which requires special tools and a certain degree of training.

The second problem is that the construction of typical cross connect fields come as units which then must be individually secured to mounting surfaces. Cross-connect wire support brackets are added where necessary. The wires then must be routed, or dressed properly, so that the cross connect field does not become an unintelligible mass of intertwined multi-colored wires. Again, this is not the type of task the average office worker willingly undertakes. Attempts to rearrange connections on such a cross connect field by an untrained person are difficult at best.

SUMMARY OF THE INVENTION

We have designed a modular cross connect housing which allows multi-conductor cables carrying a number of line circuits to be plugged into mating connectors. In addition, cables coming from the telephone stations are similarly plugged into mating connectors. The connectors from the lines as well as from the stations are pre-wired to standard telephone jacks thereby allowing the communication customer to simply snap one end of a double plug-ended cord into the desired line jack and the other end of the cord into the desired station jack and the cross connection is completed.

The housing is constructed in a manner which allows the line and station cables, which are positioned once and only occasionally rearranged, to be supported properly and rotated out of sight. The housing is also constructed such that the jack fields are vertically oriented along a hinged panel thereby allowing several such panels to be mechanically interconnected in the horizontal direction as the cross connect field expands. Using this arrangement, and by sloping the hinged panel, the double-ended patch cords hang neatly with the topmost cables naturally falling behind those plugged into lower jacks.

The interconnections between the multiconductor connector and the individual jacks are made in groups with each group mounted on a printed wire type board which is then inserted into the panel along the vertical axis. This arrangement allows the housing to be expanded easily by first snapping together a new vertical section and then inserting the interconnection boards having the desired configuration. The entire assembly can be expanded without the use of tools, except to initially secure one panel to a mounting surface.

DETAILED DESCRIPTION

Figure 1:
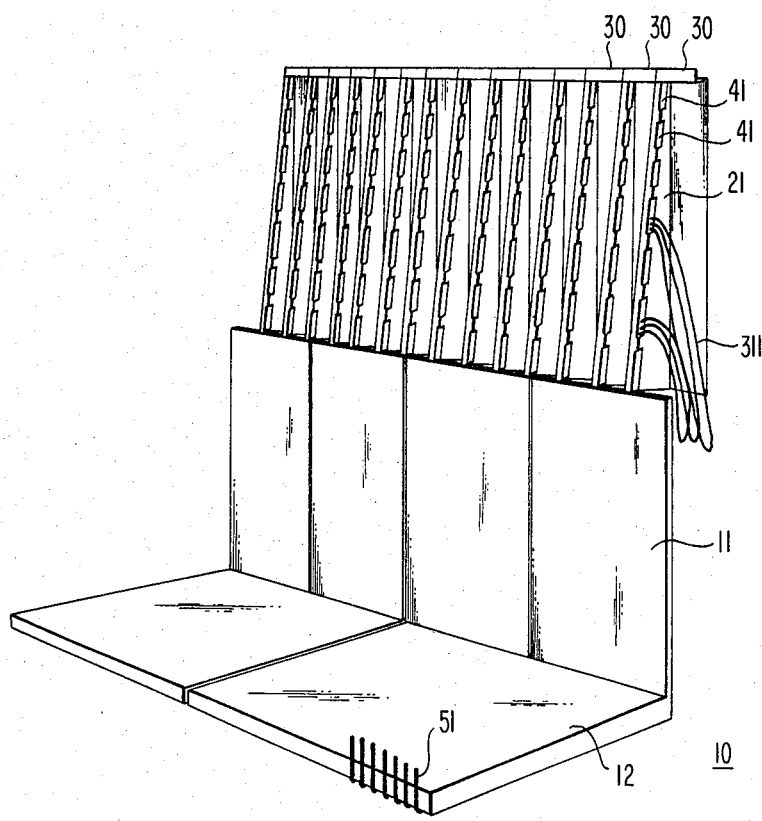
FIG. 1 shows a version of our cross connect panel with lower panels covering the wiring.

As shown in FIG. 1, modular cross-connect field 10 is constructed from a series of support panels 30 mechanically interconnected together side by side. As will be seen, any number of panels 30 may be added at any time to expand the size of the cross connect field. Included in each section are a number of jacks 41 arranged in groups, each group vertically displaced with respect to the next adjacent group. Some of these jack groups are electrically connected to lines extending to a switch, for example, a PBX or central office, while others of the jack groups are electrically connected to individual telephone stations. By using double plug-ended patch cords 311 a user may connect any jack associated with a station to any jack associated with a line.

Cross-connect field 10 may be mounted on a wall simply by fastening one or more of panels 30 to the wall and then expanding the field on either side of the fixed panel. The field may also be made free-standing by connecting it to a base 12. The wires can be covered with plates 11.

Figure 8:
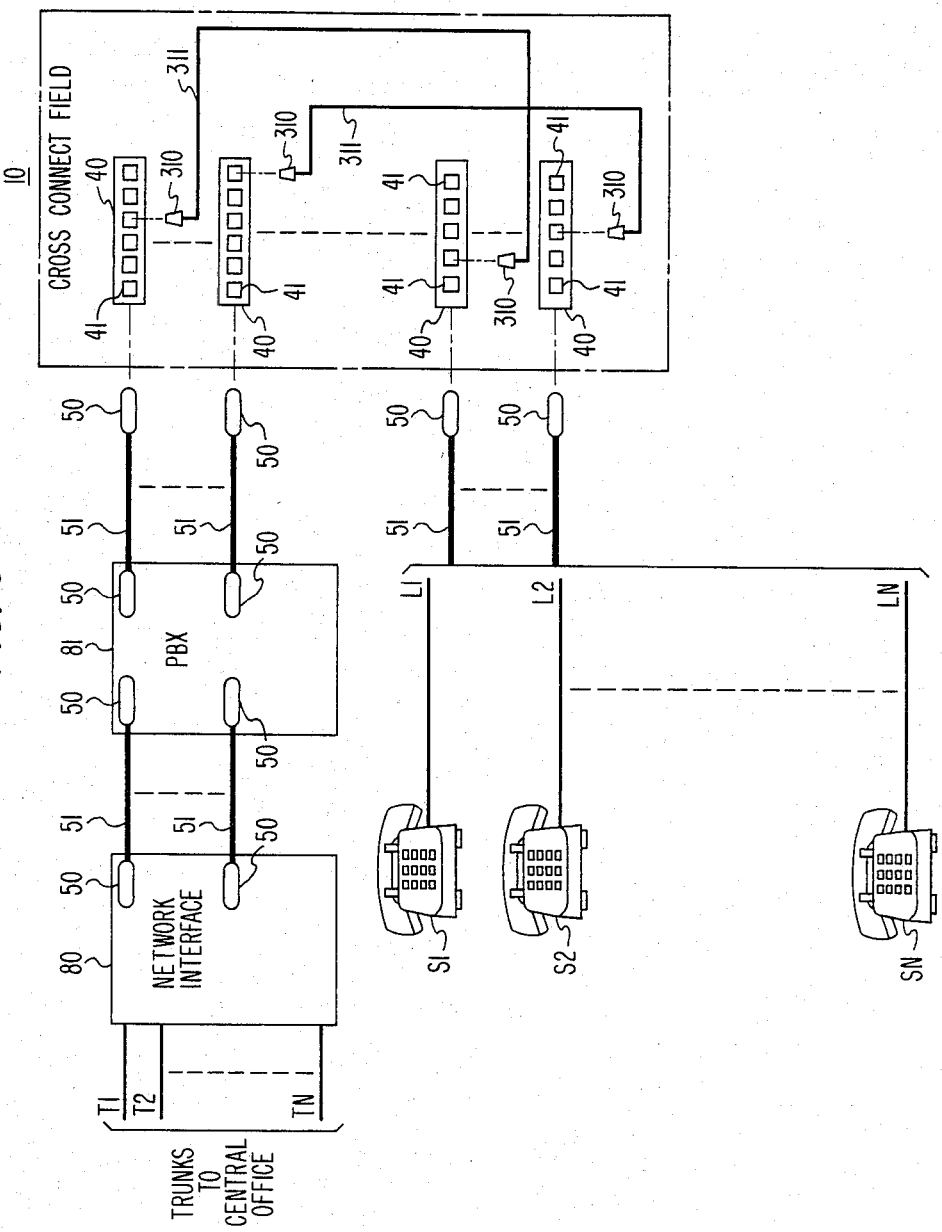
FIG. 8 shows a typical schematic cross-connect layout.

Before continuing our discussion, it may be helpful to review the context in which cross connect field 10 can be utilized. This can be seen in FIG. 8 where single central office trunks T1-TN are shown terminating at network interface 80 where the individual trunks are combined into multi-conductor cables 51 fitted with cable connectors 50. These connectors are in turn connected to PBX 81 and lines from PBX 81 are also fitted with connectors 50 for plugging into modular cross connect field 10. Lines L1-LN from each telephone station set also grouped into cables 51 fitted with connectors 50 and plugged into the modular cross connect field 10 using different termination points.

As will be seen, each cable 51 is connected to a particular jack set 40 and the cable pairs within the cable are connected to individual jacks 41. Double plug-ended patch cords 311 are then used to interconnect any jack 41 associated with a station set with any jack 41 associated with a PBX or other central switching facility line. The user then, by simply changing patch cords 311, may change the association between any PBX (or CO)

line and any station. This interconnection is made via jack fields in the manner to be discussed.

It is understood that the arrangement shown is but one utilization of our modular cross contact field and several other adaptions are possible. Also, it should be pointed out that not all installations will require a PBX and in such situations the trunks can be combined into cables and the cables plugged directly into the cross connect field.

Figure 2:
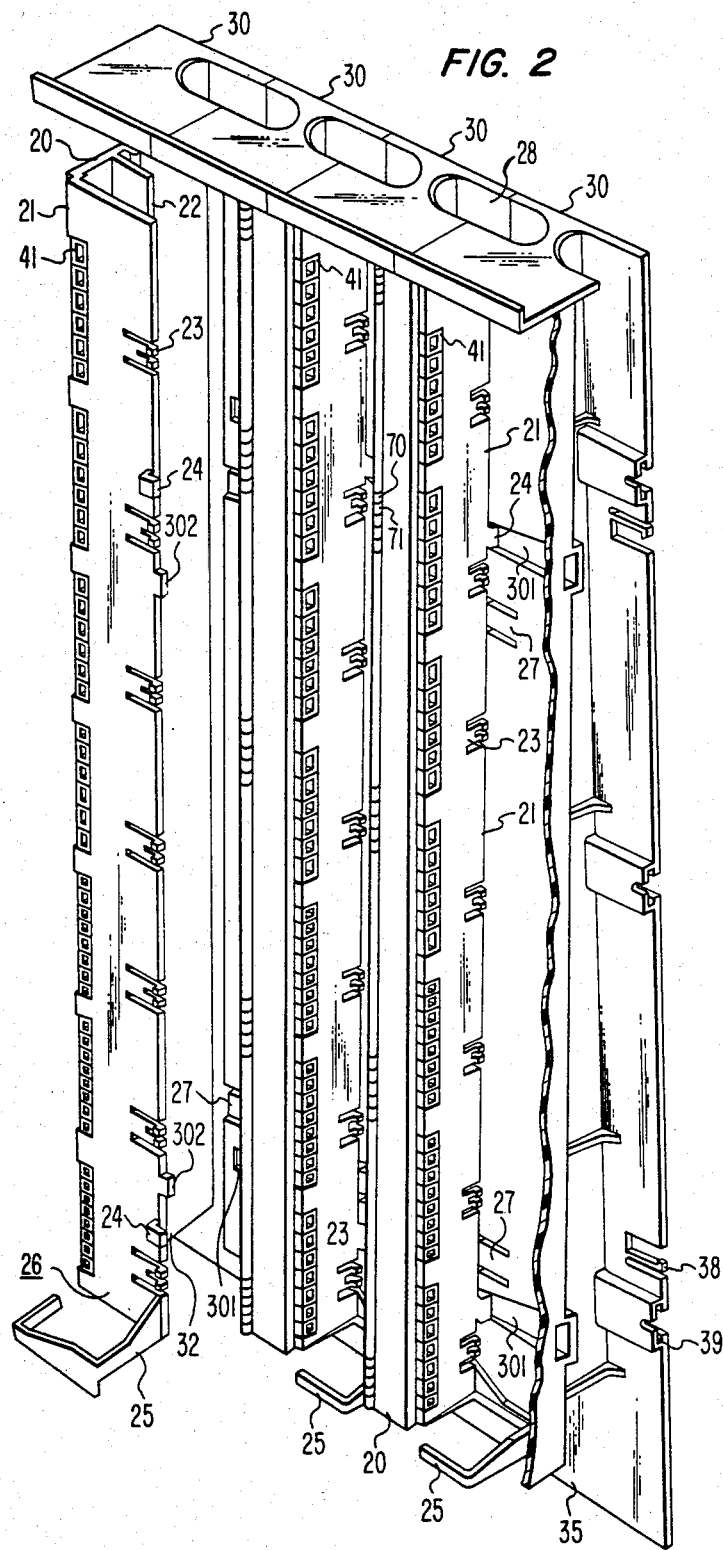
FIG. 2 shows a more detailed version of three (3) sections of the panel.

Turning now to FIG. 2, each of the modular support panels 30 has an integral backing plate 35 and an attached vertical connector panel 26 upon which are mounted several sets of jacks 41. In the assembly shown there are seven (7) such groups of jacks displaced vertically along the forward edge of connector panel 26.

As will be seen, connector panel 26 is hinged to and supported by panel 32 and rotates outward (open) toward the user by a series of partial hinges 70 and 71. The far left connector panel 26 is shown rotated partially open. The hinge is constructed such that connector panel 26 is free to rotate outward to a position where its back surface 22 is substantially in the same plane as panel 32.

At the bottom of each hinged connector panel 26 is cord retainer 25 which serves to guide cords 311 when connector panel 26 is rotated. Each panel 26 has a set of tabs 24 along the free edge of panel 21 for engaging slots 301 for positioning panel 26 when the panel is rotated inward or closed. These tab and slot combinations will serve the function of holding the free edge of panel 26 in proper vertical alignment. Also on the free edge of panel 26 are tabs 302 (shown on the left most panel) which engage pawl 27 (shown on the right most panel) when connector panel 26 is rotated inward. This tab and pawl combination serves to hold the inwardly rotated panel in locked position.

Figure 3:
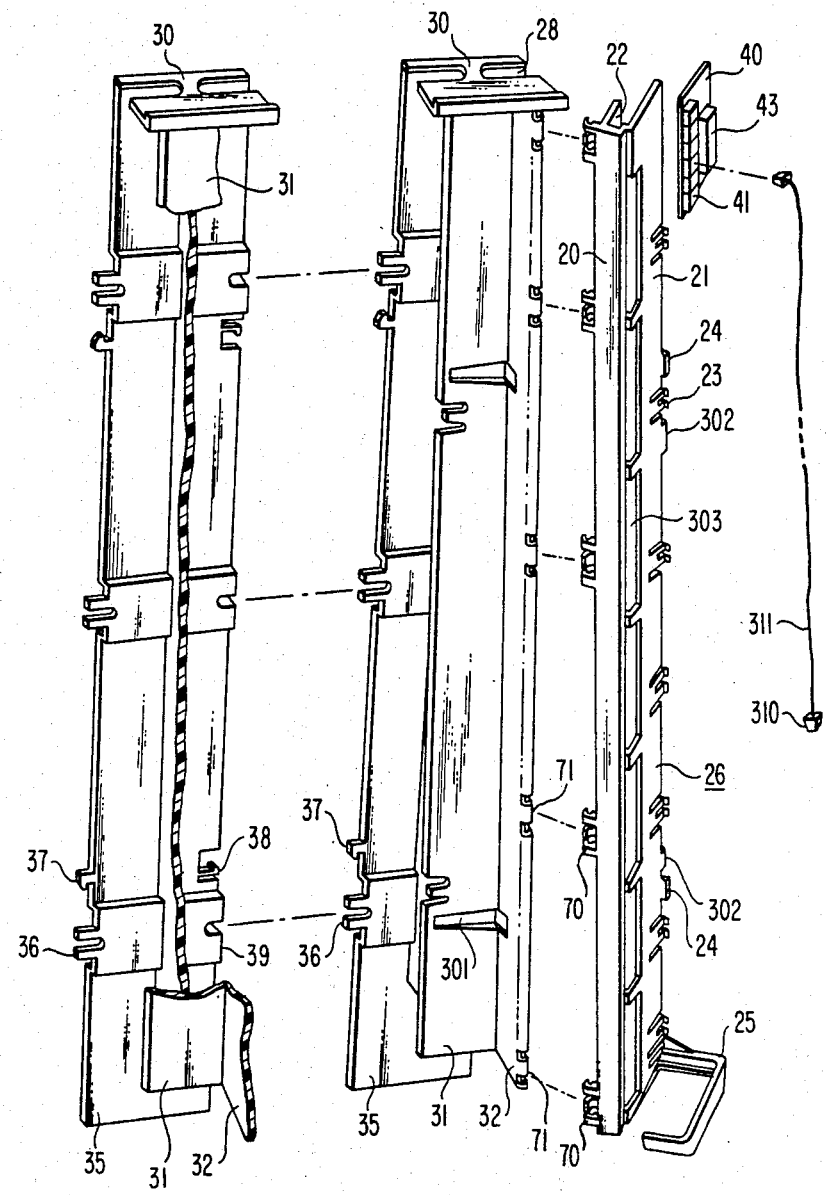
FIG. 3 shows an exploded view of parts of two (2) panels with one (1) of the panels shown in cut-away version.

FIG. 3 shows panels 30 exploded apart demonstrating how extra panels can be added as necessary. When pushed together, receptical 39 of the left most panel 30 engages pins 36 for proper positioning while mating pawls 38 and 37 at the top and bottom of panel 30 engage thereby locking the two panels together. The left most panel 30 shows a cut-away portion of support bracket 31 which, in the right most panel 30, is shown in full detail.

As can be seen in the right most panel, support panel 31 has panel 32 perpendicular to back panel 35 and to support panel 31. Bracket 31 and the front edge of panel 32 slope outwardly (away) from top to bottom so that there is more distance between the outer edge of panel 32 and back 35 at the bottom than there is at the top. This slop of panel 32 causes patch cords which are plugged into upper jacks to naturally fall behind (closer to support bracket 31) cords which are plugged into jacks lower on connector panel 26.

Connector panel 26 is hinged as discussed before via partial hinges 70 and 71 to panel 32 and comprises a J-shaped structure having panels 22 and 21 substantially parallel to each other interconnected by panel 20 at the base of the J. Hinge 70 is mounted on the same edge of panel 20 as is panel 22. Panel 20 provides a surface for marking the identity of each of the jacks so that a user will know where to plug the patch cords.

Slots 303 are molded into connector panel 26. These slots are displaced vertically from each other and are designed to accept a group of connector jacks such as jacks 41 mounted on board 40 such that when board 40 is inserted into position behind panel 21 jacks 41 appear within slot 303. In this way a user, as discussed above, may plug a patch cord, such as patch cord 311 having plugs 310 at either end, into any jack 41 while the remainder of plug board 40 is hidden from view.

Figure 4:
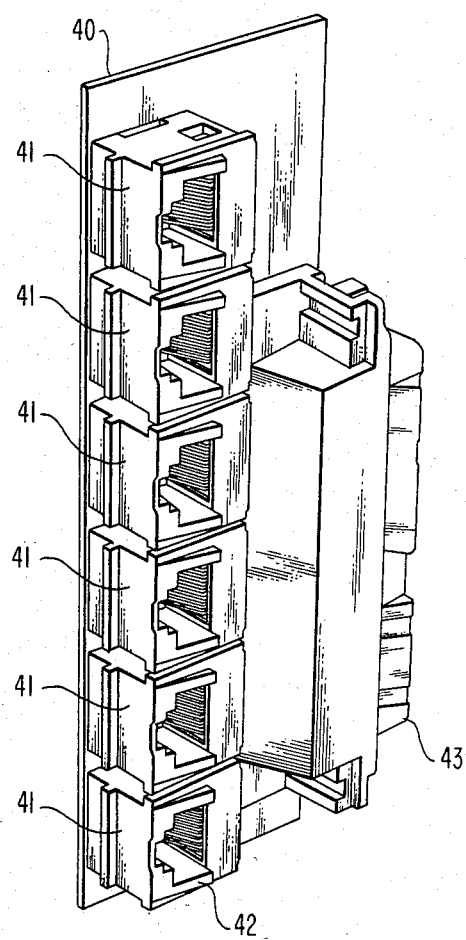
FIG. 4 is a detailed view of one of several variations of a jack and connector insert board.
Figure 5:
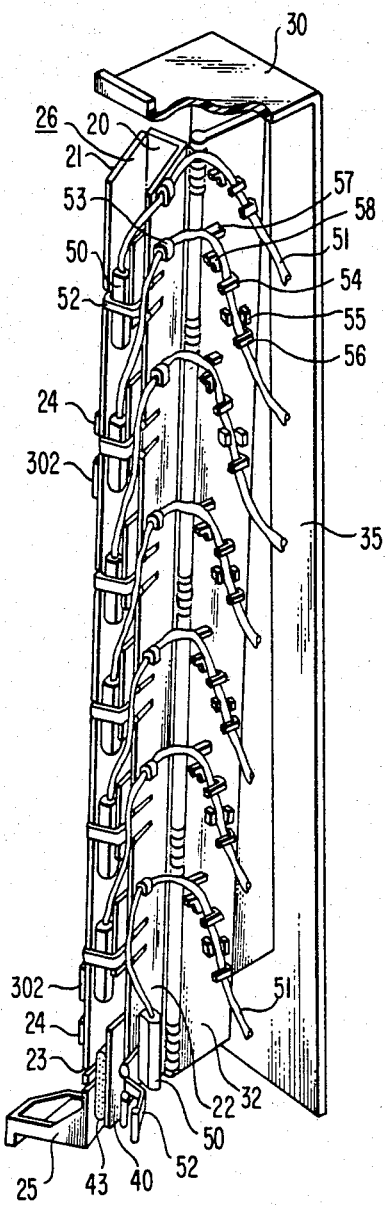
FIG. 5 shows a detailed view of the cabling assembly for one (1) panel.

In FIG. 4 there is shown plug board 40 having arranged on it six (6) jacks 41 and a connector 43. Any number of jacks of any type can be used depending upon the application. Jacks 41 are arranged to accept the standard telephone plug (such as plug 310, FIG. 3) now commonly available to telephone users. However, it should be noted that any type of jack and plug combination can be used in substitution of the type of jack and plug shown. Connector 43 can be, for example, of the type which terminates a multi-cable connector such as a miniature ribbon 50 pin connector 50 (FIG. 5). It should also be noted that the cables can be connected directly to the jacks. Ramps 42 are molded into a surface of jacks 41 and serve the purpose, as will be seen, of locking the board assembly into connector panel 26.

Turning to FIG. 5, one cross connect assembly 30 is shown with connector panel 26 rotated outward and cables 51 lead from the bottom through a series of cable support guides 56, 55, 54 and 53 to the respective connector 43 on the jack board which has been inserted into a slot position on connector panel 26. The bottom most cable 51 is shown with its connector 50 disconnected from mating plug 43. When connector 43 and 50 are mated, (as shown for the other connectors) retainer 52 locks the two connectors together.

It should be noted that because of the sloped surface of panel 32, there is more room for cables at the bottom of the assembly than there is at the top. This is necessary because typically cables enter from the floor and thus there are more cables at the bottom than at the top. By leaving the top of panels 30 open, cables may also enter from above through openings 28.

When connector panel 26 is rotated open, guide 53 on the back surface of panel 22 is substantially in the same plane but displaced forward of guides 54, 55, 56 and 57 on support panel 30. This arrangement causes cables 51 to follow a path first upward and through guide 53, then across the hinge assembly, and then gently curve downward via guides 57, 58 and then through guides 54, 55 and 56. When panel 26 is rotated into locked position, (to the right in FIG. 5) guide 53 moves into a position in the same plane as, but displaced substantially rearward of, guides 54–58. This movement causes cables 51 to rotate, as opposed to bending, within guides 54–56 thereby maintaining substantially the same curve of cables 51 in both the open and closed position. Without these support guides cables 51 will hang and fold improperly and either prevent connector panel 26 from fully rotating into the closed position or cables 51 will crimp or jam. In the closed position a user only sees the front surface of jacks 41 through slots 303 and not the cables.

As shown, the cables first lead upward from each jack set board 40, through guide 53 on movable panel 26 and then across the hinge area through guides 57 and 58, guide 54, guide 55 and guide 56 and then downward and out of the base of panel 30. Guides 54–58 are positioned on a slope to maintain the proper curve of cables 51 in both the open and closed positions. Of course, each jack set can have multiple cables each individually terminated either by direct wiring or by one or more connectors. The cables going to a particular jack set will pass through the same guide set.

Figure 6:
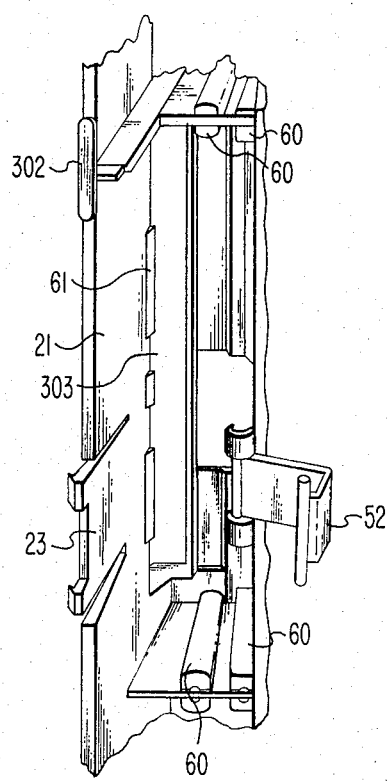
FIG. 6 shows a detailed view of a portion of the panel designed to receive the jack and connector board.

FIG. 6 shows a cut-away view of connector panel 26 with slot 303 where each jack board slides in between runners 60 on the top and bottom. Ramps 61 serve to lock each board in position by engaging with ramp 42 (FIG. 4) on the jack and helps position the board.

Figure 7:
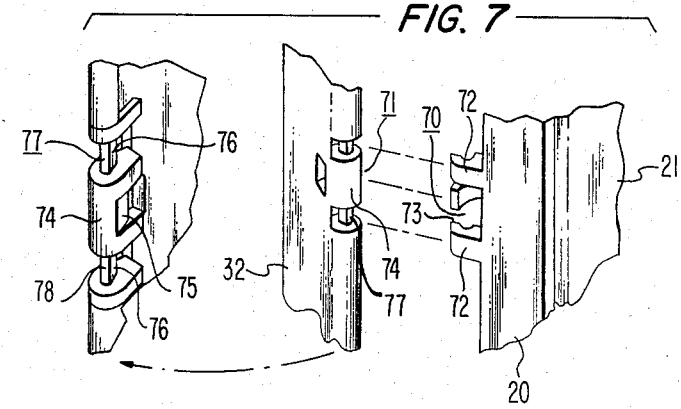
FIG. 7 shows a view of the panel hinge assembly.

FIG. 7 shows hinge assembly 70 and 71, one part of which is mounted on the forward (outer) surface of panel 32 and the other part of which is mounted on panel 20. Hinge assembly 70, 71 is constructed with posts 77 having both flat surface 76 and curved surface 78 with the flat surfaces 76 of each post 77 opposite and parallel to each other. Center post 74 has a flat section 75. The wide portion of post 74 serves an aesthetic function when the hinge is assembled and the assembly is in the closed position so that a viewer does not see a gap between upper and lower fingers 72. This arrangement allows semi-circular hinge portion 70 to snap on or off posts 77 and 74 only when ends 73 of fingers 72 line up with the flat portion of posts 77 and 74 and fingers 72 flex apart. Center finger 72 engages flat portion 75 of the center post 74. Only when the hinge is lined up in this fashion can the hinge portions be separated or assembled.

What is claimed is:

1. A modular cross-connection field comprising a vertically mountable connector panel and a stationary support panel adapted to support said connector panel, said connector panel comprising, a plurality of slots each displaced vertically from the other when said connector panel is supported in position by said support panel, means on a first side of said connector panel for positioning and retaining with respect to each said slot a plurality of jacks, said means arranged such that jacks positioned thereby will be accessible through said associated slot from a second side of said connector panel, first cable support means associated with each said slot on said first side of said connector panel for positioning a cable for attachment to said jacks associated with said slot said cable support means including a second flange mounted offset from and parallel to said connection panel, and wherein said stationary support panel comprises means for supporting said connector panel such that said connector panel is free to rotate with respect to said support panel, second cable support means associated with each said slot and positioned on said stationary support panel such that said second cable support means cooperates with said first cable support means when said connector panel is supported by said support panel to retain each said cable attached to each said jack associated with each said slot said second cable support means positioned with respect to said first cable support means such that when said connector panel is rotated open, said first and second cable support means are in substantially the same plane with said first cable support means displaced forward of said second cable support means and such that when said connector panel is rotated closed with respect to said stationary panel said first and second cable support means are also in substantially the same plane with said first cable support means positioned partially rearward of said second cable support means.

2. The invention set forth in claim 1 wherein said stationary panel includes a top to bottom forwardly sloped divider section having at least one support means for positioning said connector panel when said connector panel is rotated in said closed position and wherein said connector panel has at least one support means for mating with said stationary panel support means when related to said closed position.

3. The invention set forth in claim 1 wherein each said plurality of jacks associated with each said slot are mounted on a common plug-in board, and wherein said first side of said connector panel includes means for locking said plug-in board in position relative to each said slot.

4. The invention set forth in claim 3 wherein said plug-in board has at least one multi-pin connector for terminating cables positioned by said associated first and second cable support means.

5. The invention set forth in claim 1 wherein said supporting means includes first hinge means mounted on one of said panels having at least two vertically displaced semi-circular flexible fingers having their curved surfaces facing in a first direction and a third semi-circular flexible finger vertically displaced between said first two fingers, said third finger having its curved surfaces facing in a direction opposing said first direction, and second hinge means mounted on the other of said panels having bearing surfaces around which said first, second and third semi-circular fingers rotate.

6. The invention set forth in claim 5 wherein said bearing surfaces include posts having curved surfaces and flat surfaces.

7. The invention set forth in claim 1 wherein said support panel includes along the side edges thereof means for interlocking with a next adjacent support panel.

8. A modular cross-connect field for use in interconnecting any one of a number of communication terminals with any one of a number of communication lines, said cross-connect field comprising a back panel having a first surface adapted for mounting to a mounting support, a support panel affixed to said back panel having at least one surface perpendicular to said back panel, said support panel having a front edge vertically sloped with respect to said back panel when said back panel is mounted to a mounting support, a connector panel having a plurality of slots therein, each said slot vertically displaced with respect to a next adjacent slot, means for mounting jacks within each of said slots, and means for mounting one edge of said connector panel to said front edge of said support panel such that said connector panel rotates with respect to said support panel, said support panel perpendicular surface includes a plurality of cable support means each associated with a particular one of said slots when said connector panel is mounted to said support panel, and wherein said connector panel includes a plurality of cable support means each associated with one of said slots, and wherein said mounting means includes means for rotating said connector panel such that said support panel cable support means and said connector panel cable support means are in substantially the same plane with each other when said panel is rotated to a closed position.

9. The invention set forth in claim 8 wherein said connector panel includes means for securing a set of said jacks in position so that said jacks are visible through said slots.

10. The invention set forth in claim 9 wherein some of said jack sets are electrically connected to said terminals and some of said jack sets are electrically connected to said lines via cables supported by said cable supports and wherein said cross connections are made by double plug-ended cords connected between selected ones of said jacks.

11. The invention set forth in claim 8 wherein each said back panel includes means for mating along a vertical edge thereof with a vertical edge of a next adjacent back panel.

12. The invention set forth in claim 8 wherein said mounting means includes first hinge means mounted on one of said panels having at least two vertically displaced semi-circular flexible fingers having their curved surfaces facing in a first direction and a third semi-circular flexible finger vertically displaced between said first two fingers, said third finger having its curved surfaces facing in a direction opposing said first direction, and second hinge means mounted on the other of said panels having bearing surfaces around which said first, second and third semi-circular fingers rotate.

13. The invention set forth in claim 12 wherein said bearing surfaces includes posts having curved surfaces and flat surfaces.

14. A modular cross-connection field comprising a vertically mounted connector panel and a stationary support panel adapted to support said connector panel, said connector panel comprising, means on a first side of said connector panel for positioning sets of jacks, said means arranged such that jacks positioned thereby will be accessible from a second side of said connector panel, first cable support means associated with each said jack set for positioning a cable for attachment to said jacks, and wherein said stationary support panel comprises means for mounting to a support surface such that said support panel is perpendicular to said support surface means for supporting said connector panel on an edge of said support panel away from said support surface, said edge sloped from top to bottom away from said support surface such that said connector panel is free to rotate with respect to said support panel, a plurality of second cable support means associated with each said jack set and angled with respect to the vertical and displaced in substantially a straight line along said stationary support panel, said second cable support means cooperating with said first cable support means when said connector panel is supported by said support panel to retain each said cable attached to each said jack set both when said connector panel is rotated open and when said connector panel is rotated closed with respect to said stationary panel such that a cable supported thereby rotates within said plurality of second cable support means to prevent said cable from folding upon itself in both said open and closed positions.

15. The invention set forth in claim 14 wherein each of said plurality of jack sets are mounted on a plug-in board, and wherein said first side of said connector panel includes means for locking said plug-in board in position.

16. The invention set forth in claim 15 wherein said plug-in board has a multi-pin connector for terminating said cable positioned by said associated first and second cable support means.

17. A connector panel comprising a stationary portion and a portion rotatable with respect to said stationary portion, means for mounting jacks on said rotatable portion, means for connecting wire cables to said jacks, means including a plane offset from and parallel to said jack mounting means on said rotatable portion and associated with each said jack mounting means for positioning a said cable connected to said associated jack, means on said stationary portion arranged to cooperate with each said cable positioning means for maintaining said cable in substantially the same plane both when said rotatable portion is rotated against said stationary portion and when said rotatable portion is rotated away from said stationary portion.

18. The invention set forth in claim 17 wherein said stationary portion positioning means includes a guide set angled from the vertical through which said cable is free to rotate in accordance with the rotation of said rotatable portion.

19. The invention set forth in claim 17 wherein said stationary portion supports said rotatable portion by a set of vertically displaced hinges, each hinge including first hinge means mounted on one of said panels having at least two vertically displaced semi-circular fingers having their curved surfaces facing in a first direction and a third semi-circular finger vertically displaced between said first two fingers, said third finger having its curved surfaces facing in a direction opposing said first direction, and second hinge means mounted on the other of said panels having bearing surfaces around which said first, second and third semi-circular fingers rotate.

20. The invention set forth in claim 19 wherein said stationary portion has an outer edge sloping outward from top to bottom, said edge containing a portion of said hinge.

21. The invention set forth in claim 17 wherein said jacks are arranged as a plurality of jack sets and wherein each jack set is vertically displaced from the next adjacent jack set, and each jack set is connectable to at least one of said cables and removable from said rotatable portion while other of said cables remain connected to others of said jack sets.

* * * * *